United States Patent
Park et al.

(10) Patent No.: US 11,916,889 B2
(45) Date of Patent: Feb. 27, 2024

(54) COMPUTER NETWORK FOR SECURE IP TO NON-IP COMMUNICATION AND BACKEND DEVICE, GATEWAY, FRONTEND DEVICE THEREFORE AND PROCEDURE FOR OPERATION THEREOF

(71) Applicant: Inventronics GmbH, Munich (DE)

(72) Inventors: Jiye Park, Munich (DE); Prajosh Premdas, Freising (DE); Markus Jung, Feldkirchen (DE); Bernhard Siessegger, Unterschleissheim (DE)

(73) Assignee: Inventronics GmbH, Munich (DE)

( * ) Notice: Subject to any disclaimer, the term of this patent is extended or adjusted under 35 U.S.C. 154(b) by 115 days.

(21) Appl. No.: 17/493,871

(22) Filed: Oct. 5, 2021

(65) Prior Publication Data
US 2022/0109658 A1    Apr. 7, 2022

(30) Foreign Application Priority Data
Oct. 5, 2020    (DK) .............................. PA202070676

(51) Int. Cl.
*H04L 29/06*    (2006.01)
*H04L 9/40*    (2022.01)

(52) U.S. Cl.
CPC ........ *H04L 63/0435* (2013.01); *H04L 63/029* (2013.01); *H04L 63/0823* (2013.01); *H04L 63/166* (2013.01); *H04L 63/20* (2013.01)

(58) Field of Classification Search
CPC .............. H04L 63/0435; H04L 63/029; H04L 63/0823; H04L 63/166; H04L 63/20; H04L 63/0442; H04L 12/4633; H05B 47/175
See application file for complete search history.

(56) References Cited

U.S. PATENT DOCUMENTS 8,811,188 B1 *   8/2014   Bagchi ...................... G06F 8/65
                                                        370/254
2017/0063999 A1 *  3/2017  Adrangi .............. H04W 12/037
(Continued)

FOREIGN PATENT DOCUMENTS

CN    211180606 U    8/2020
WO    2014008042 A1  1/2014

OTHER PUBLICATIONS

Bhargavan et al., "Triple Handshakes and Cookie Cutters: Breaking and Fixing Authentication over TLS", IEEE Symposium on Security and Privacy, May 18-21 (Year: 2014).*

*Primary Examiner* — Morshed Mehedi
(74) *Attorney, Agent, or Firm* — Yu Gang

(57) ABSTRACT

A computer network may include a Non-IP subnetwork for communication between the gateway and the frontend device, an IP subnetwork for communication between the gateway and at least one backend device, and a gateway connecting the Non-IP subnetwork with the IP subnetwork and translating communication therebetween. The IP communication is based on an IP security protocol, providing means for authentication and/or encryption. The gateway mediates handshaking for establishing a secure tunnel for secure end-to-end communication between the backend device and the frontend device. The secure tunnel is set to apply a session key. The gateway and the backend device exchange datagrams with handshaking parameters. The Non-IP messages are exchanged with a subset of the handshaking parameters. The backend device and the frontend device generate the session keys and to authenticate the handshaking incorporating the handshaking parameters and subset of handshaking parameters, respectively.

13 Claims, 3 Drawing Sheets

(56) References Cited

U.S. PATENT DOCUMENTS

2018/0063079 A1* 3/2018 Ding .................... H04L 63/0464
2018/0288013 A1* 10/2018 Hennebert ............ H04W 12/08
2021/0021578 A1* 1/2021 Falk .................... H04L 63/0209

* cited by examiner

COMPUTER NETWORK FOR SECURE IP TO NON-IP COMMUNICATION AND BACKEND DEVICE, GATEWAY, FRONTEND DEVICE THEREFORE AND PROCEDURE FOR OPERATION THEREOF

CROSS-REFERENCE TO RELATED APPLICATION

The present patent application claims priority, according to 35 U.S.C. § 119, from Danish patent application PA202070676 filed on Oct. 5, 2020, the entire disclosure of which is incorporated by reference.

TECHNICAL FIELD

The disclosure relates generally to a computer network, comprising a Non-IP subnetwork with at least one frontend device; and an IP subnetwork with at least one backend device; and a gateway connecting both subnetworks and translating data communication therebetween, wherein the IP communication between the backend device and the gateway is based on an IP security protocol, providing means for authentication and/or encryption; and wherein the communication between the gateway and the frontend device is a Non-IP communication. Additionally, a safe procedure for operating such a computer network and the components thereof are disclosed.

BACKGROUND

The internet of things (IoT) concerns a connection of heterogenous objects to a typically cloud based backend device. These objects may comprise smart personal devices, automation set-ups with home appliances and systems for entertainment, illumination and surveillance as well as factory machines with sensors and actors to name a few. The backend device provides data to the object (frontend device) or allows it to access corporate applications based on cloud computing.

The aforementioned connectivity of IoT systems causes crucial security risks, which are alleviated within IP networks by establishing a secure communication tunnel between remote hosts based on an IP security protocol such as the stream oriented Transport Layer Security (TLS), Secure Sockets Layer (SSL), Internet Protocol Security (IPsec) or Datagram Transport Layer Security (DTLS), wherein DTLS could be transported via the User Datagram Protocol (UDP) and preserves the underlying transport's semantics.

In the context of the present application IP stands for "Internet Protocol", which defines packet structures for encapsulating data to be communicated to a remote destination host and which is operated according to the multi-level OSI model. The data encapsulation leads to packets with headers containing IP address information, wherein packets are datagrams at level L3 (network layer) of the OSI model. Without limitation of the present application, currently, the major IP versions are IPv4 and IPv6.

An IP security protocol could prevent eavesdropping, tempering or message forgery of the communication between hosts of an IP network or linked IP networks. However, it could not be applied without further measures if a Non-IP subnetwork device participates in the communication. This is often the case if an unsophisticated frontend device, such as a smart light system or a sensor of a machine tool, has to be incorporated within an IoT system. Usually, such an ordinary frontend device is part of a Non-IP subnetwork, providing a communication, which is not IP based. Non-IP communication could for example rely on Digital Addressable Lighting Interface (DALI) or a communication via Zigbee, Bluetooth or a field bus, e.g. KNX. Moreover, a gateway is typically used as bridge between a Non-IP subnetwork and an IP subnetwork, especially by realizing data translation as disclosed by U.S. Pat. No. 8,837,485 B2.

A possible way to enhance the trustworthiness of a Non-IP subnetwork is to apply hop-by-hop authentication and using encryption of messages exchanged between the frontend device and the gateway by applying pre-shared keys. However, the protocol for the hop-by-hop authentication within Non-IP subnetworks is often vendor specific. Furthermore, safe hop-by-hop data transport until the gateway does not solve the issue of broken end-to-end security, since data leaving the Non-IP subnetwork has to be decrypted by the gateway before being sent to a backend within a IP subnetwork. In that scenario a Non-IP subnetwork frontend device is not capable to determine if the gateway got compromised or not.

For a more sophisticated approach towards end-to-end security TLS/DTLS session resumption has been proposed. This requires an initial TLS/DTLS handshake between the IP subnetwork backend device and the gateway, leading to session information handed over to the Non-IP subnetwork frontend device in a next step. Based thereon, a Non-IP subnetwork frontend device is capable to generate a new session key. However, the trustability of the gateway would still be an issue because a data packet with a resumption request, transmitted via the gateway, would allow to reconstruct the new session key from the known information of the previous session.

Since the gateway represents a major security hazard of mixed IP/Non-IP networks, it is often the case that non-standardized proprietary security software is applied, leading to an interoperability concern, since a frontend device of a first vendor might not be accepted as compatible with a second vendor's gateway.

SUMMARY

The object of the present disclosure is to alleviate the above-mentioned problems and to describe a computer network, capable of establishing a non-vendor specific, secure end-to-end communication via a tunnel between a frontend device of a Non-IP subnetwork and a backend device of an IP subnetwork. Furthermore, interoperable components of the computer network and a safe operating procedure for the computer network are to be disclosed.

A computer network may include a Non-IP subnetwork with at least one frontend device; and an IP subnetwork with at least one backend device; and a gateway device connecting the Non-IP subnetwork with the IP subnetwork and translating data communication therebetween, wherein the communication between the backend device and the gateway is based on a IP security protocol, providing means for authentication and/or encryption; and wherein the communication between the gateway and the frontend device is a Non-IP communication.

With this starting point, the inventors have realized that the gateway should be configured to mediate handshaking for establishing a tunnel for secure end-to-end communication between the backend device and the frontend device. The secure tunnel applies a session key, generated by the frontend device and the backend device during the handshaking, wherein the gateway itself does not get in possession of the session key.

For this purpose, the gateway and the backend device are configured to exchange datagrams with handshaking parameters utilizing IP communication and wherein the gateway and the frontend device are configured to exchange Non-IP messages with a subset of the handshaking parameters. In a non-limiting embodiment, the subset of the handshaking parameters comprises a first random number generated by the gateway and second random number generated by the backend device, which are used in combination with a secret encryption information to generate the session key on the side of the frontend device and on the side of the backend device.

For the backend device, the gateway appears as fully established handshaking partner, providing IP-based datagrams for the chosen secure end-to-end communication and the encryption method applied. Especially, the gateway transmits verified random numbers and/or public certificates to the backend device instead of the frontend device and translates the compulsive handshaking data received from the backend to the Non-IP communication to forward the mandatory information to the frontend device.

Additionally, the frontend device, as the real end-to-end security peer of the backend device, is shielded from the full handshaking procedure and the gateway provides only the mandatory subset of the handshaking parameters to it, which is required to allow the frontend device to generate its share of the compulsive handshaking information.

The handshaking mediation of the gateway allows the backend device to generate the session key and to authenticate the handshaking incorporating the handshaking parameters. Furthermore, the frontend device is configured to generate the session key and to authenticate the handshaking incorporating the subset of the handshaking parameters provided by the gateway.

Even though the gateway handles all handshaking messages, it is not capable to generate a session key therefrom. The gateway lacks the secret encryption information required to correctly interpret the data content of the subset of the handshaking parameters. For an exemplary embodiment, the secure end-to-end communication between the backend device and the frontend device is established with symmetric encryption requiring pre-shared keys as secret encryption information. The exchange thereof between the frontend device and the backend device could be conducted at the manufacturing time of the frontend device, wherein the gateway is excluded from the key exchange. Even though there is only a single initial key pair for the symmetric encryption, security is preserved since the actual session key is changed every time a new secure session is created. This provides additional security in case of a broken session, because not all future sessions are jeopardized.

As a possible alternative, asymmetric encryption is applied for the secure end-to-end communication between the backend device and the frontend device, which is certificate-based. In that respect, the gateway is not in possession of the secret encryption information, namely, the private keys owned by the communication peers (frontend device and backend device). However, it is advantageous to configure the gateway to be capable of handling a certificate or other public key of the frontend device in course of the handshaking procedure to limit the data content of the subset of the handshaking parameters, which has to be exchanged between the frontend device and the gateway.

In the following, it is supposed that the frontend device initiates the handshaking by sending a Non-IP request message to the gateway. However, this is not mandatory and should not limit the claims since the handshaking could also be triggered by the backend device. Furthermore, the specific handshaking procedure depends on the chosen IP security protocol. Regarding the non-limiting choices of TLS and DTLS as IP security protocol, further details in that respect are disclosed below. Possible Non-IP communication could be based on Zigbee, Bluetooth or a field bus such as KNX, wherein different non-IP communication protocols are feasible. This includes vendor specific non-IP communication. According to some aspects, the Non-IP communication is based on Digital Addressable Lighting Interface (DALI). Additionally, the gateway could be configured to apply different non-IP communication protocols for heterogeneous frontend devices within a Non-IP subnetwork. Furthermore, a frontend device could feature a custom application layer, providing a set of commands for its operation.

A frontend device does not necessarily require a hardware modification, which is a plus especially for unsophisticated frontend devices. The only requirement for some embodiments is that the firmware is modified such that the frontend device could run a limited implementation of the IP security protocol, which is at least capable of handling the subset of the handshaking parameters, especially with respect to mandatory verification steps on the side of the frontend device. The limited implementation of the IP security protocol also covers the frontend device's capability to generate its share of the compulsive handshaking information, which is translated, processed and forwarded to the backend device by the gateway utilizing the full implementation of the IP security protocol and IP communication.

For some further aspects, measures are taken to decrease the computational load on the side of the frontend device. This could be achieved by an embodiment for which the frontend device does not run a limited implementation of the IP security protocol by itself. Instead, the interpretation and handling of the subset of the handshaking parameters provided from the gateway is controlled by the backend device. To do so, the backend device is configured to provide directly executable commands of the frontend device's application layer, for example DALI commands, to control actions of the frontend device. This allows keeping an unsophisticated frontend device with no additional persistent memory requirements.

Once the secure end-to-end communication between the backend device and the frontend device is established the gateway cannot eavesdrop the communication or alter its content since it is not in possession of the required session key. Furthermore, a Man-in-the-Middle Attack (MITM) is not possible. In a non-limiting embodiment, further measures are applied to prevent a Replay Attack. This is achieved by configuring the frontend device and the backend device to provide time stamps for messages sent via the secure tunnel and to control the time stamps of messages received from the secure tunnel. This allows to identify and to discard a duplicate message with the same time stamp and the same data content as a previous message. Furthermore, to ease memory requirements, it is possible to apply a moving time window for accepting a message.

A further benefit results from the circumstance that for some embodiments there is no requirement to alter hardware components of the frontend device, gateway and/or the backend device. A non-limiting implementation is achieved by simply modifying the firmware thereof.

BRIEF DESCRIPTION OF THE DRAWINGS

Non-limiting embodiments become apparent form the following description, which refers to the accompanying drawings. Identical, similar or equivalent elements are provided with the same reference signs in the figures. The figures and the proportions of the elements represented in the figures among each other are not to be considered as true to scale. Rather, individual elements may be oversized for better representability and/or for better comprehensibility.

DETAILED DESCRIPTION

Figure 1:
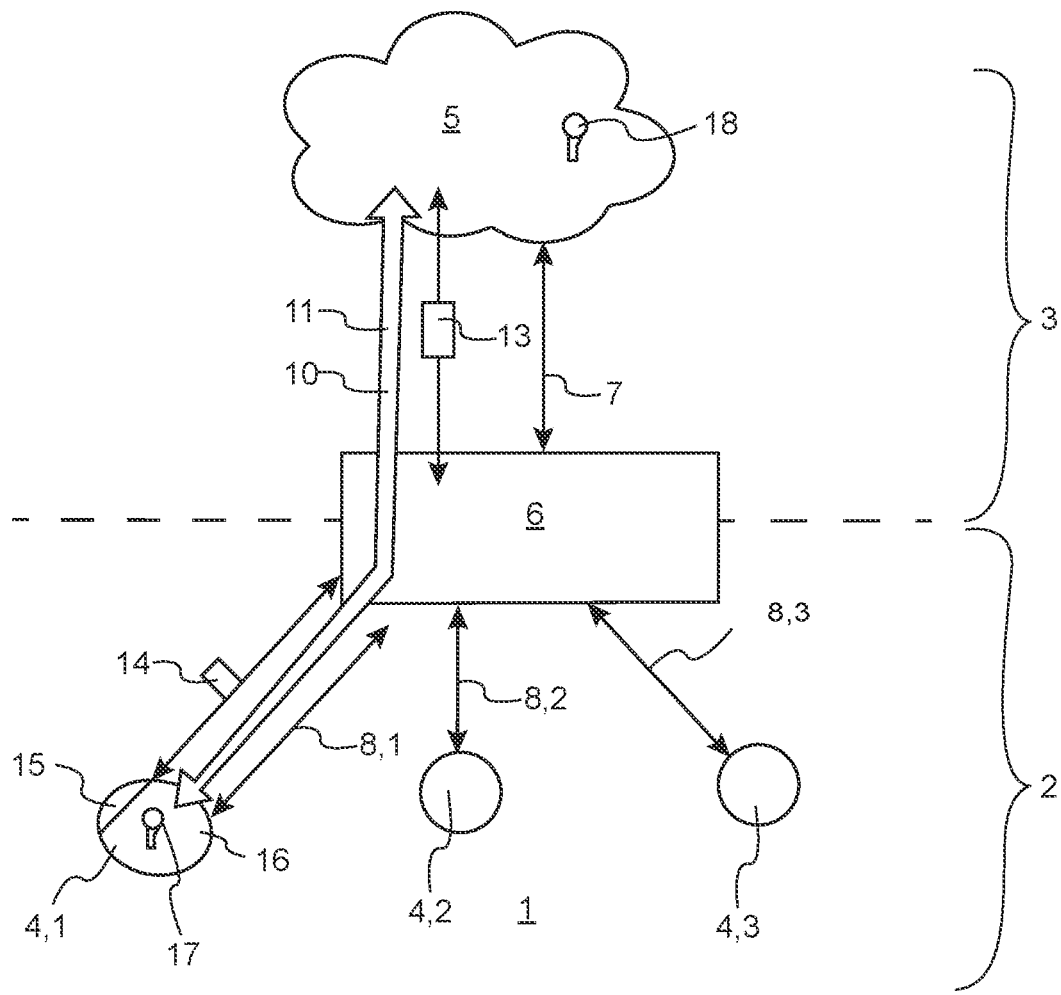
FIG. 1 is a scheme of a non-limiting embodiment of the inventive computer network.

FIG. 1 depicts schematically an embodiment of the inventive computer network 1, comprising a Non-IP subnetwork 2 with frontend devices 4.1, 4.2, 4.3, which might be sensors and/or actuators of an IoT system, and an IP subnetwork 3 with a backend device 5, possibly a cloud. A gateway 6 connects the Non-IP subnetwork 2 with the IP subnetwork 3 and translates the communication therebetween. The Non-IP communication 8.1, 8.2, 8.3 within the Non-IP subnetwork 2 could be based on Digital Addressable Lighting Interface (DALI). In that case, the gateway 6 is a DALI controller.

An IP security protocol 9, providing means for authentication and/or encryption, is applied to preserve the security of the IP communication 7 within the IP subnetwork 3, wherein Transport Layer Security (TLS) or Datagram Transport Layer Security (DTLS) are non-limiting choices for the IP security protocol 9.

According to a non-limiting embodiment, the gateway 6 is configured to mediate handshaking for establishing a secure tunnel 10 for secure end-to-end communication 11 between the backend device 5 and the frontend device 4.1, 4.2, 4.3. The communication peers frontend device 4.1, 4.2, 4.3 and backend device 5 relay on a session key 12 generated during the handshaking, which is kept unknown to the gateway 6.

Once the handshaking is triggered, possibly from the side of the frontend device 4.1, 4.2, 4.3, the gateway 6 exchanges datagrams, comprising data content with handshaking parameters 13, with the backend device 5. Additionally, the gateway 6 and the frontend device 4.1, 4.2, 4.3 are configured to exchange Non-IP messages with a subset of the handshaking parameters 14.

In the course of the handshaking, the Non-IP messages from the gateway 6 to the frontend device 4.1, 4.2, 4.3 are limited to the information necessary to allow the frontend device 4.1, 4.2, 4.3 to generate mandatory session establishing messages based on calculations involving information received from the gateway 6 in one of the previous steps of the handshaking and further involving stored secret encryption information owned by the frontend device 4.1, 4.2, 4.3 and the backend device 5, respectively. These session establishing messages are consolidated by the gateway 6 in subsequent steps of the handshaking with the already existing handshaking parameters of previous steps. Based thereon, the full set of handshaking messages required for the chosen IP security protocol 9, such as TLS or DTLS, to establish the secure tunnel 10 is exchanged between the gateway 6 and the backend device 5. Therefore, the gateway acts as communication peer of the backend device 5 during the handshaking without being the real end-to-end security peer, which is the frontend device 4.1, 4.2, 4.3.

The frontend device 4.1, 4.2, 4.3 is configured to generate the session key and to authenticate the handshaking, incorporating the subset of the handshaking parameters received via Non-IP communication 8.1 from the gateway 6. Respectively, backend device 5 is configured to generate the session key and to authenticate the handshaking incorporating the handshaking parameters extracted from the handshaking messages exchanged via IP communication 7 with the gateway 6. However, the gateway 6 is configured as not being capable to generate the session key from the handshaking parameters, since it lacks the secret encryption information required to correctly interpret the data content of at least the subset of the handshaking parameters.

Figure 2:
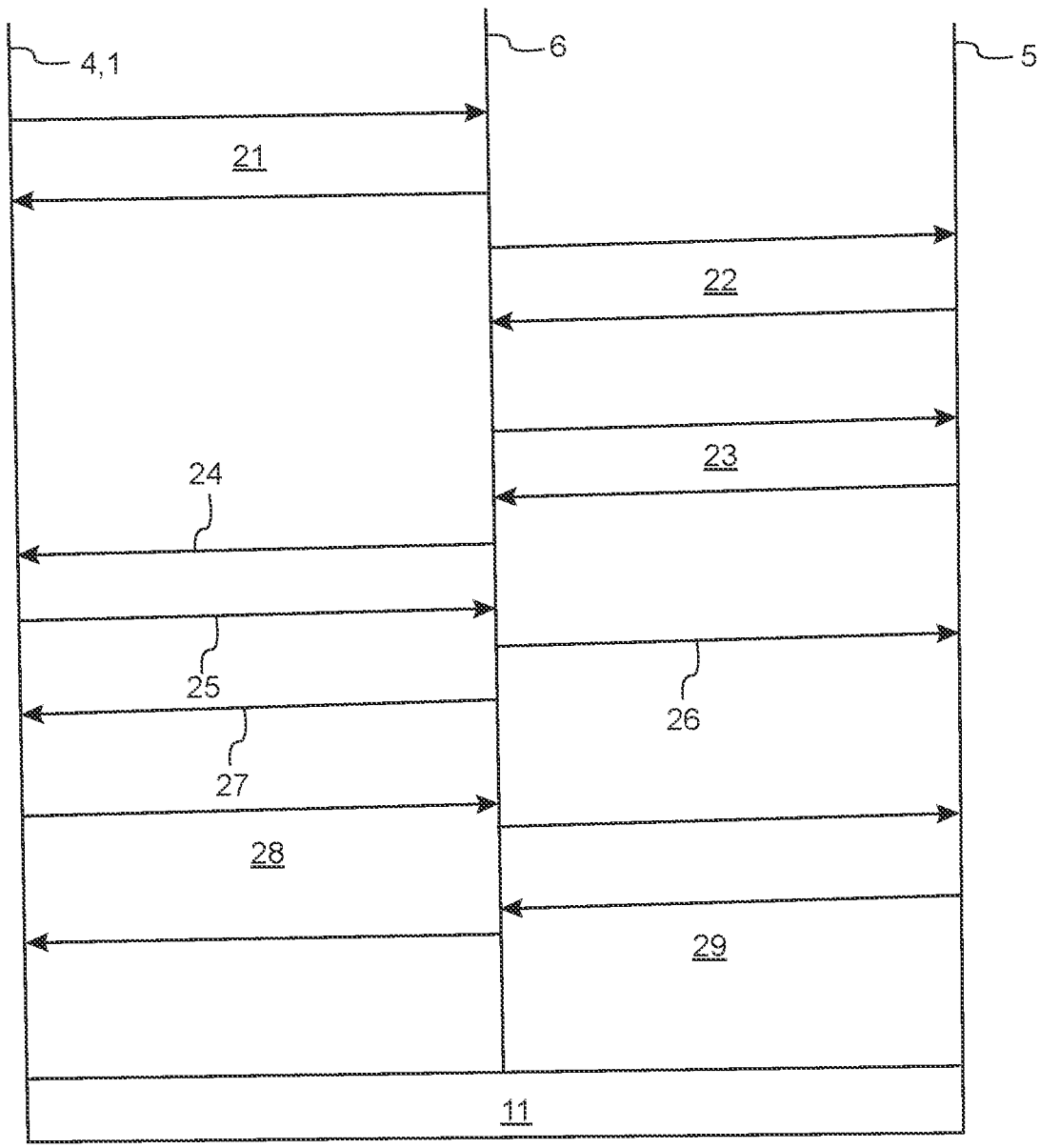
FIG. 2 depicts an embodiment of the inventive method, applying symmetric encryption.

In the present exemplary embodiment, the secure end-to-end communication 11 between the backend device 5 and the frontend device 4.1, 4.2, 4.3 is established with symmetric encryption requiring pre-shared keys 17, 18 as secret encryption information. A possible method to conduct the handshaking base thereon, utilizing DTLS as IP security protocol 9, is illustrated by FIG. 2.

During the handshake initiation 21, the frontend device 4.1 sends a request message comprising information of cloud domain name or IP address of the backend device 5. The request message sent by Non-IP communication 8.1 may comprise a cipher suit list if the device only supports certain cipher-suits for key sharing. The handshake initiation is acknowledged by the gateway 6.

As a next step, the handshaking between the communication peers gateway 6 and backend device 5 starts with as client hello message 22 from the gateway 6, which is responded by the backend device 5 with a verification message providing a cookie. Subsequently, the gateway 6 generates a first random number and transmits it to the backend device 5, which responds with a second random number to terminate the random number exchange 23 along with the status information that it is waiting for the consecutive message of the gateway 6.

The first random number and the second random number belong to the subset of the handshaking parameters 14 because they are required parameters for the generation of the session key. Therefore, a Non-IP message with the information about the random numbers 24 is forwarded from the gateway 6 to the frontend device 4.1. Upon receipt thereof, the limited implementation 15 of the IP security protocol 9 within the frontend device 4.1 sends a identifier for the pre-shared keys 17, 18 as key identification step 25 in order that the backend device 5 is capable to find the correct pre-shared key 18. Based on this information, the gateway 6 conducts a key identity step 26, which for DTLS is addressed as sending a ClientKeyExchange/ChangeCipherSpec message to the backend device 5. Additionally, the gateway 6 transmits a Hash handshake message 27 to the frontend device 4.1 summarizing the subset of the handshaking parameters 14, which is used for the session key generation on both sides of the tunnel 10. Therefore, the frontend device 4.1 can check the integrity of the entire handshake process mediated by the gateway 6. As positive response, the frontend device 4.1 sends an acknowledgment message 28 with a "verify data" as content, added to a respective client message from the gateway 6 to the backend device 5. As a handshake accomplishment step 29, the backend device 5 sends a "ChangeCipherSpec Finished" with a "verity data(server)" content, being translated in a respective Non-IP message to the frontend device 4.1. Now, both the frontend device 4.1 and the backend device 5 are capable to generate the session key for the secure end-to-end communication 11, while the gateway 6 is not in possession of the session key.

The exchange of the initial keys 17, 18 for the symmetric encryption between the frontend device 4.1 and the backend device 5 could be conducted at the manufacturing time of the frontend device 4.1, wherein the gateway 6 is excluded from the key exchange. Even though there is only a single initial key pair for the symmetric encryption, security is preserved since the actual session key is changed every time a new secure session is created. This provides additional security in case of a broken session, because not all future sessions are jeopardized.

Figure 3:
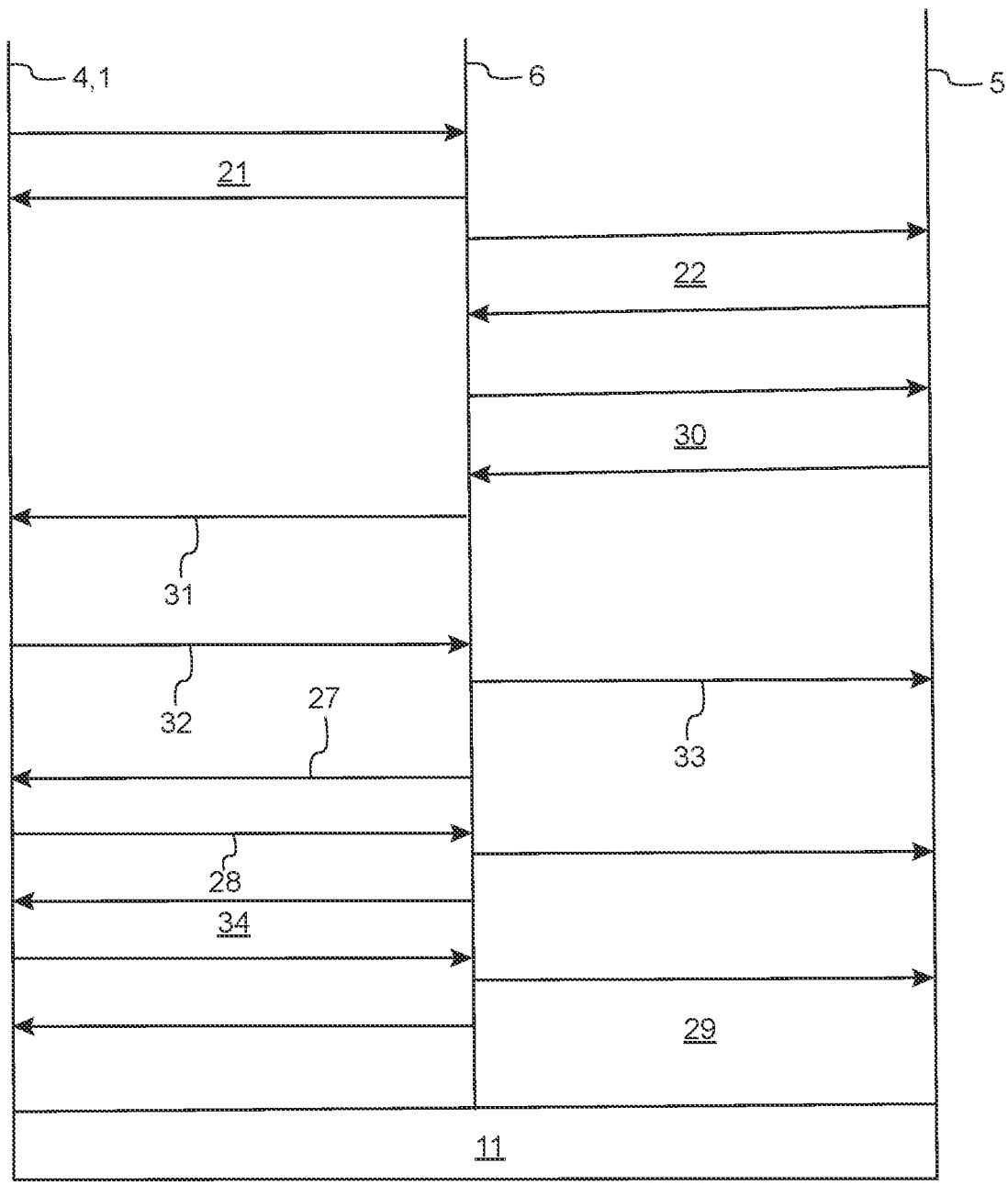
FIG. 3 depicts an embodiment of the inventive method, applying asymmetric encryption.

For an alternative embodiment, an asymmetric encryption is applied for the secure end-to-end communication 11 between the backend device 5 and the frontend device, 4.1, which is certificate-based. FIG. 3, presents an illustration thereof, wherein the same reference numerals are shown for method steps in common with the above described embodiment.

A random number and certificate exchange 30 is conducted, wherein the certificate is assigned to the backend device 5 and a first random number is generated by the gateway 6 and a second random number is generated by the backend device 5. This information, belonging to the mandatory subset of the handshaking parameters 14 is transmitted to the frontend device 4.1 with method step 31. This enables the frontend device 4.1 to generate a pre-master secret and to encrypt it with the public key of the backend device 5, as shown by the pre-master secret message 32. Upon receipt thereof, the gateway 6 transmits a ClientKeyExchange message 33, containing the pre-master secret and the certificate of the frontend device 4.1. The subsequent messages resemble the above explained steps for verification and acknowledging, beside the added second Hash message 34. Their purpose is to allow a verification and authentication of the above-mentioned steps before both the frontend device 4.1 and the backend device 5 apply the session key for the secure end-to-end communication 11 therebetween.

The gateway 6, not in possession of the secret encryption information, namely, the private keys exclusively owned by the communication peers, is not capable to derive the session key, which is changed every time a new secure session is generated.

LIST OF REFERENCE NUMERALS 1 computer network
2 Non-IP subnetwork
3 IP subnetwork
4.1, 4.2
4.3 frontend device
5 backend device
6 gateway
7 IP communication
8.1, 8.2,
8.3 Non-IP communication
9 IP security protocol
10 secure tunnel
11 secure end-to-end communication
12 session key
13 handshaking parameters
14 subset of the handshaking parameters
15 limited implementation
16 application layer
17 pre-shared key
18 pre-shared key
21 handshake initiation
22 client hello message
23 random number exchange
24 information about random numbers
25 key identification step
26 key identity step
27 Hash handshake message
28 acknowledgment message
29 handshake accomplishment step
30 random number and certificate exchange

What is claimed is:

1. A computer network for secure IP to Non-IP communication, wherein the computer network comprises:
   a Non-IP subnetwork with at least one frontend device;
   an IP subnetwork with at least one backend device;
   a gateway configured to connect the Non-IP subnetwork with the IP subnetwork and configured to translate communication therebetween,
   wherein the communication between the backend device and the gateway is an IP communication based on an IP security protocol, providing means for authentication and/or encryption; and
   wherein the communication between the gateway and the frontend device is a Non-IP communication;
   wherein the gateway is configured to mediate handshaking for establishing a secure tunnel for secure end-to-end communication between the backend device and the frontend device, wherein the secure tunnel is set to apply a session key; and
   wherein the gateway and the backend device are configured to exchange datagrams with handshaking parameters; and
   and wherein the gateway and the frontend device are configured to exchange Non-IP messages with a subset of the handshaking parameters; and
   wherein backend device is configured to generate the session key and to authenticate the handshaking incorporating the handshaking parameters; and
   wherein frontend device is configured to generate the session key and to authenticate the handshaking incorporating the subset of the handshaking parameters; and
   wherein gateway is configured as not being capable of generating the session key from the handshaking parameters.

2. The computer network according to claim 1, wherein the subset of the handshaking parameters comprises a first random number generated by the gateway and second random number generated by the backend device.

3. The computer network according to claim 1, wherein the IP security protocol is set to apply symmetric encryption based on keys pre-shared between the frontend device and the backend device.

4. The computer network according to claim 1, wherein the IP security protocol is set to apply asymmetric encryption, wherein the gateway is configured to handle a certificate of the frontend device.

5. The computer network according to claim 1, wherein the IP security protocol is Transport Layer Security (TLS) or Datagram Transport Layer Security (DTLS) or Secure Sockets Layer (SSL) or Internet Protocol Security (IPsec).

6. The computer network according to claim 1, wherein the Non-IP communication is based on Digital Addressable Lighting Interface (DALI).

7. The computer network according to claim 1, wherein the frontend device and the backend device are configured to provide time stamps for messages sent via the secure tunnel and to control the time stamps of messages received from the secure tunnel.

8. The computer network according to claim 1, wherein the gateway is configured to provide a full implementation of the IP security protocol and the frontend device is configured to provide a limited implementation of the IP security protocol.

9. The computer network according to claim 1, wherein the backend device is configured to provide encapsulate commands of an application layer of the frontend device to control the frontend device in the course of the handshaking.

10. A frontend device for a computer network;
- wherein the frontend device is configured to communicate with a gateway within a Non-IP subnetwork by applying a Non-IP communication;
- wherein the gateway is configured to communicate with a backend device within an IP subnetwork by applying IP communication based on an IP security protocol, which provides means for authentication and/or encryption; and
- wherein the frontend device is set to exchange data with the backend device via a secure tunnel for secure end-to-end communication, wherein the secure tunnel is set to apply a session key; and
- wherein the frontend device is configured to run a limited implementation of the IP security protocol such that the frontend device is capable to interpret Non-IP messages with a subset of the handshaking parameters, provided from the gateway, which mediates handshaking for establishing the secure tunnel, to generate the session key.

11. A method for operating a computer network, wherein the computer network comprises:
- a Non-IP subnetwork with at least one frontend device; and
- an IP subnetwork with at least one backend device; and
- a gateway connecting the Non-IP subnetwork with the IP subnetwork and translating communication therebetween,
- wherein the communication between the backend device and the gateway is an IP communication based on an IP security protocol, providing means for authentication and/or encryption; and
- wherein the communication between the gateway and the frontend device is a Non-IP communication;
- wherein the method comprises:
- conducting a handshaking for establishing a secure tunnel for secure end-to-end communication between the backend device and the frontend device, wherein the secure tunnel is set to apply a session key;
- wherein the gateway mediates the handshaking without getting in possession of the session key by providing datagrams with handshaking parameters to the backend device and by providing Non-IP messages with a subset of the handshaking parameters to the frontend device;
- wherein the frontend device generates the session key incorporating the handshaking parameters;
- wherein the backend device generates the session key incorporating the subset of the handshaking parameters.

12. The method for operating a computer network according to claim 11, wherein the IP security protocol applies symmetric encryption based on keys pre-shared between the frontend device and the backend device.

13. The method for operating a computer network according to claim 11, wherein the IP security protocol applies asymmetric encryption, wherein the gateway handles a certificate of the frontend device.

* * * * *